United States Patent
Yoon et al.

(10) Patent No.: US 8,671,993 B2
(45) Date of Patent: Mar. 18, 2014

(54) FLEXIBLE SHORT PIPE HAVING SHOCK ABSORBING FUNCTION

(75) Inventors: Chi-Ho Yoon, Daejeon (KR); Byung-Sik Ahn, Daejeon (KR); Jong-Myung Park, Daejeon (KR)

(73) Assignee: Korea Institute of Geoscience and Mineral Resources (KIGAM), Daejeon (KR)

( * ) Notice: Subject to any disclaimer, the term of this patent is extended or adjusted under 35 U.S.C. 154(b) by 1007 days.

(21) Appl. No.: 12/760,865

(22) Filed: Apr. 15, 2010

(65) Prior Publication Data
US 2011/0232797 A1    Sep. 29, 2011

(30) Foreign Application Priority Data
Mar. 23, 2010 (KR) .................. 10-2010-0025776

(51) Int. Cl.
*F16L 11/00* (2006.01)
(52) U.S. Cl.
USPC ............................ 138/118; 138/30; 285/223
(58) Field of Classification Search
USPC ......... 138/30, 26, 118–121; 285/19, 223, 229
See application file for complete search history.

(56) References Cited

U.S. PATENT DOCUMENTS

| | | | |
|---|---|---|---|
| 1,475,289 A * | 11/1923 | Diescher | 285/19 |
| 3,305,251 A * | 2/1967 | Skinner | 285/229 |
| 3,420,553 A * | 1/1969 | Poxon et al. | 285/49 |
| 3,550,639 A * | 12/1970 | Okuda | 138/121 |
| 4,243,253 A | 1/1981 | Rogers, Jr. | |
| 5,829,483 A * | 11/1998 | Tukahara et al. | 138/109 |
| 5,983,950 A * | 11/1999 | Aoki et al. | 138/109 |
| 6,631,741 B2 * | 10/2003 | Katayama et al. | 138/121 |
| 7,128,095 B2 * | 10/2006 | Hayashi | 138/30 |
| 7,445,030 B2 | 11/2008 | Hardy et al. | |
| 2010/0246331 A1 * | 9/2010 | Paul et al. | 367/173 |

FOREIGN PATENT DOCUMENTS

JP        02008580        1/1990

* cited by examiner

*Primary Examiner* — Patrick F Brinson
(74) *Attorney, Agent, or Firm* — Rabin & Berdo, P.C.

(57) ABSTRACT

Disclosed herein is a flexible short pipe having a shock absorbing function. The flexible short pipe has flexibility so as to absorb shocks generated in the longitudinal direction of a lifting pipe (or flexible pipe) and have resistance to a bending load or a torsional load when being wound around a roller. The flexible short pipe includes flanges provided at upper and lower ends thereof to be coupled to a unit lifting pipe or flexible pipe. An inner layer has a curved shape and is provided between the upper and lower flanges to allow slurry, lifted up or discharged by a lifting pump, to flow along the inner layer. An outer layer has a curved shape and surrounds the inner layer. A shock absorbing means is positioned between the inner layer and the outer layer, and absorbs longitudinal force and bending force.

6 Claims, 11 Drawing Sheets

FIG. 9
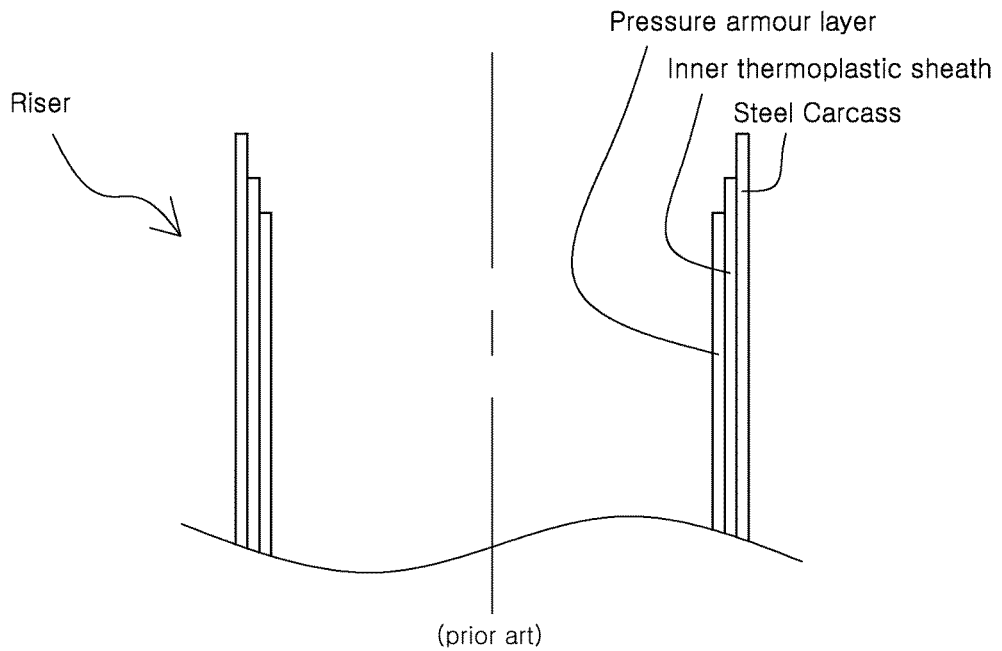
(prior art)
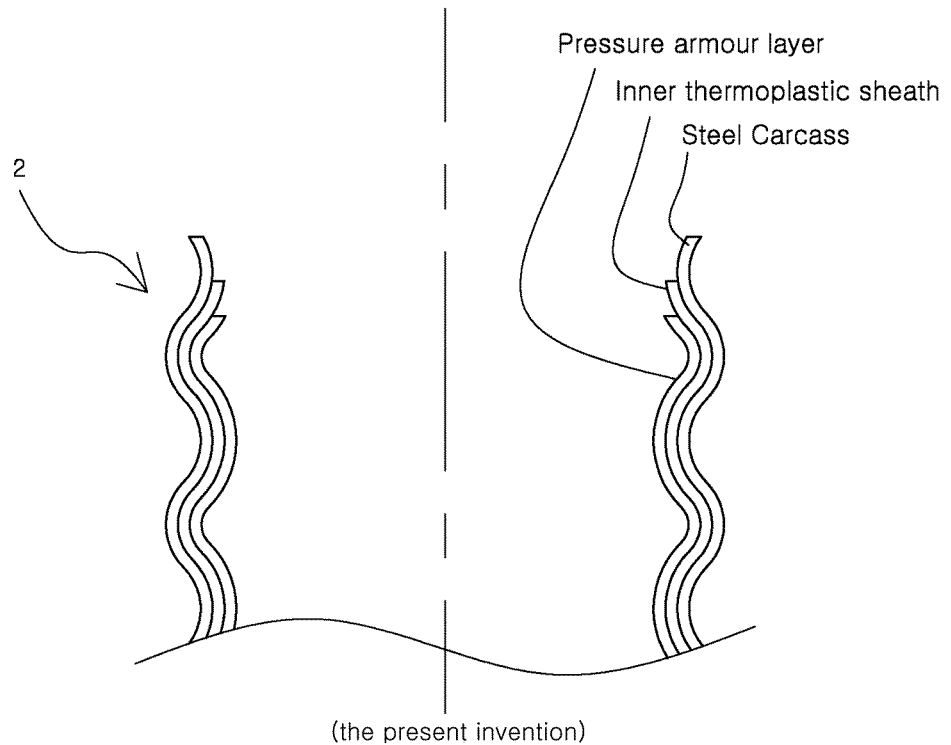
(the present invention)

FLEXIBLE SHORT PIPE HAVING SHOCK ABSORBING FUNCTION

BACKGROUND OF THE INVENTION

1. Field of the Invention

The present invention relates generally to a flexible short pipe having a shock absorbing function and, more particularly, to a flexible short pipe which flexibly endures high pressure generated at a discharge port of a lifting pump as well as fatigue load, tensile load, and bending load generated by external force when a unit lifting pipe (or flexible pipe) which is used to collect manganese nodules from the floor of the deep sea and has a predetermined length is coupled to an adjacent unit lifting pipe (or flexible pipe).

2. Description of the Related Art

A variety of systems have been proposed to collect manganese nodules from the surface of the ocean floor. However, most of the systems include a collector which collects manganese nodules from the surface of the ocean floor, a lifting pump, a flexible pipe which couples the collector with the lifting pump and feeds the manganese nodules, mud and seawater from the collector, and a lifting pipe which moves slurry (manganese nodules, mud and seawater) from the lifting pump to a ship or platform.

As the demand for mineral resources increases all over the world, marine mineral resources have been coming into the spotlight as an alternative. Among them, manganese nodules found on the floor of the deep sea have a flat or spherical shape and are blackish brown and non-crystalline substances. When collecting the manganese nodule, it is soft. Meanwhile, when the manganese nodule dries, it becomes hardened and breaks easily.

The main constituents of a manganese nodule are manganese, iron, silica, and water, and the composition of minor constituents of the manganese nodule varies depending on the region. There are several theories about the formation of the manganese nodule: the precipitation of colloidal hydroxides, and the catalysis of iron oxide. The manganese nodule is buried in the deep sea at depths of from 4000 to 5000 m. It is reported that the growth rate of a manganese nodule is about 0.01 to 1 mm per every 1000 years.

As shown in FIG. 1, a system for mining the manganese nodule from the floor of the deep sea includes a collector which collects the manganese nodule from the floor of the deep sea, a flexible pipe which is coupled to the collector to transfer the manganese nodule to a lifting pump, a lifting pump which provides transfer force to the flexible pipe, a lifting pipe which is coupled to the lifting pump, and a marine onboard processor which is coupled to the lifting pipe and processes or stores the collected manganese nodule.

The flexible pipe coupling the collector with the lifting pump uses negative pressure generated in a suction port of the lifting pump as a driving force to feed the manganese nodule, mud and seawater from the collector to the lifting pump. That is, slurry is lifted up by the suction pressure of the lifting pump.

Thus, the flexible pipe maintains its pressure lower than the surrounding pressure and must be made of a material which can endure the pressure. Further, the material must bear fatigue load, longitudinal tensile load and bending load, similarly to the lifting pipe.

The lifting pipe is subjected to high positive pressure discharged from the lifting pump. Thus, the lifting pipe must also be made of a material which can endure high pressure generated in the discharge port of the lifting pump, as well as fatigue load, tensile load, and bending load.

FIG. 2 is a sectional view showing a riser which is used to collect oil from the sea and has a shape similar to that of the lifting pipe (or flexible pipe). Here, the riser has a layer structure made of a variety of materials so that it can resist pressure.

The lifting pipe (or flexible pipe) applied to the lifting system is problematic because the collector moves on the surface of the ocean floor. As shown in FIG. 3 which is a conceptual view of a conventional crude oil collecting system, in a marine oil collecting platform to which the conventional riser is applied, one side of the riser feeding oil from an oil collecting hole to the marine platform is secured to the bottom of the sea, so that there are few cases in which shocks are abruptly applied.

However, in the lifting system for lifting manganese nodules, the collector always moves, and a sudden movement occurring on a ship or a sudden change in ocean current affects the lifting pipe or the flexible pipe, hindering the smooth movement of the collector.

Further, in the marine platform for collecting oil, the riser or the like is not frequently taken up and installed. However, in the lifting system, the lifting pipe (or flexible pipe) must be frequently taken up to perform system checks or for other reasons.

FIG. 4 is a perspective view illustrating a conventional lifting pipe and a roller for rolling the lifting pipe. The roller is constructed to lift up and roll the lifting pipe (or flexible pipe) when it is required to be stored on the ship. Meanwhile, when it is required to lower the lifting pipe (or flexible pipe) to the bottom of the sea, the lifting pipe is unrolled from the roller.

Further, in order to allow the lifting pipe (or flexible pipe) to be smoothly lifted up or down, a guide device is used as an auxiliary device as shown in FIG. 5. This enables the lifting pipe (or flexible pipe) to be smoothly lifted up and down at the time of going into and out the sea.

However, a conventional coupling pipe for coupling lifting pipes (or flexible pipes) shown in FIGS. 4 and 5 is problematic because it has a simple coupling pipe structure having a linear shape, so that it insufficiently absorbs longitudinal shocks caused by sudden changes in a ship, collector, or seawater when the lifting pipe (or flexible pipe) enters the sea water and then performs a lifting operation, and has insufficient resistance to the force of a bending load and a torsional load, and thus a junction part between the coupling pipe and the lifting pipe (or flexible pipe) may be damaged. That is, the conventional coupling pipe is problematic in that it cannot flexibly cope with high pressure generated in the discharge port of the lifting pump as well as not with fatigue load, tensile load, and bending load.

That is, the movement of a ship being moved by seawater, tide or wind affects the lifting pipe secured to the ship. The ship continuously repeats pitching, rolling and yawing under the external force. In the case where the quantity of motion is small, load acting on the lifting pipe is only small longitudinal load generated by the movement of a short distance, so that a big problem does not occur. However, when an abrupt and large load is generated by unexpected causes, it acts as a longitudinal load on the lifting pipe, affects even the lifting pump, and additionally affects the collector because of the flexible pipe coupled to the lifting pump. Thereby, the collector may deviate from its trajectory or from the bottom of the sea, thus negatively affecting the smooth operation of the collector. The conventional coupling pipe for coupling lifting pipes or flexible pipes has low resistance to the above deformation because of structural problems.

Further, the conventional coupling pipe has no structure for enduring the bending and torsional load acting on the lifting pipe (or flexible pipe). Thus, when the lifting pipe is wound around the roller as shown in FIG. 4, a bending load acts on the lifting pipe (or flexible pipe), and any form of torsional load acts on the lifting pipe because it is long. Therefore, the coupling pipe for coupling the lifting pipes or flexible pipes is also subjected to the load, but the conventional coupling pipe is problematic in that it has no resistance to the deformation.

SUMMARY OF THE INVENTION

Accordingly, the present invention has been made keeping in mind the above problems occurring in the prior art, and an object of the present invention is to provide a flexible short pipe having flexibility so as to absorb shocks generated in the longitudinal direction of a unit lifting pipe (or flexible pipe) and have resistance to a bending load or a torsional load when being wound around a roller.

Another object of the present invention is to provide a flexible short pipe which has a detachable short pipe structure allowing it to be easily coupled to a lifting pipe or flexible pipe.

A further object of the present invention is to provide a flexible short pipe having an outer diameter which is equal or similar to a lifting pipe (or flexible pipe), thus being easily stored in a roller at the time of installation or winding back up.

In order to accomplish the above objects, the present invention provides a flexible short pipe including flanges provided at upper and lower ends thereof to be coupled to a unit lifting pipe or flexible pipe, an inner layer having a curved shape and provided between the upper and lower flanges to allow slurry, lifted up or discharged by a lifting pump, to flow along the inner layer, an outer layer having a curved shape and surrounding the inner layer, a shock absorbing means positioned between the inner layer and the outer layer and absorbing longitudinal force and bending force.

The shock absorbing means may include a plurality of joints serving as hinges, and a plurality of shock absorbers extending or contracting in a longitudinal direction, the joints and the shock absorbers being repeatedly arranged in a vertical direction and secured to the upper and lower flanges.

A plurality of unit shock absorbing means secured to the upper and lower flanges may be arranged along a circle.

The inner layer of the curved shape may have a multi-layer structure including a steel carcass, an inner thermoplastic sheath and a pressure armour layer which are sequentially arranged in a direction from an outer to an inner position.

A stationary part provided on a first side of the shock absorber may be secured to a first joint, and a cylindrical movable part provided on a second side of the shock absorber may be secured to a second joint, so that a rod provided on the stationary part may be inserted into the movable part in such a way as to move in a vertical direction.

A sealing space defined between the movable part and the rod may be filled with oil or air, so that a restoring force is generated when stress is removed.

The inner layer and the outer layer may be spaced apart from each other to have a space therebetween.

BRIEF DESCRIPTION OF THE DRAWINGS

The above and other objects, features and advantages of the present invention will be more clearly understood from the following detailed description taken in conjunction with the accompanying drawings, in which:

FIG. 9 is a view illustrating an inner layer structure of the flexible short pipe according to the embodiment of the present invention and a layer structure of a conventional lifting pipe;

DESCRIPTION OF THE PREFERRED EMBODIMENTS

The construction and operation of an embodiment of the present invention will be described below in detail with reference to the accompanying drawings. Further, when it is determined that the detailed description of the known art related to the present invention may obscure the gist of the present invention, the detailed description will be omitted.

Figure 1:
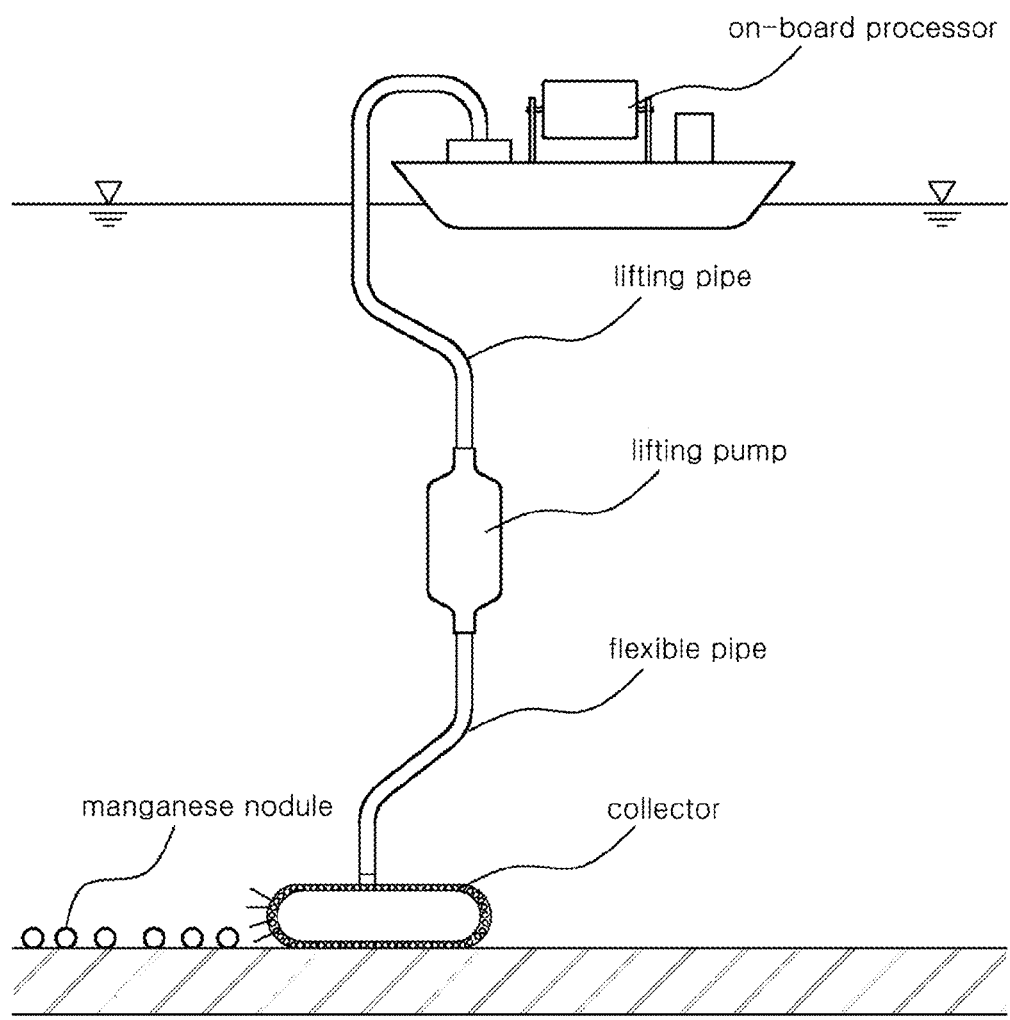
FIG. 1 is a schematic view illustrating a conventional manganese nodule mining system.
Figure 2:
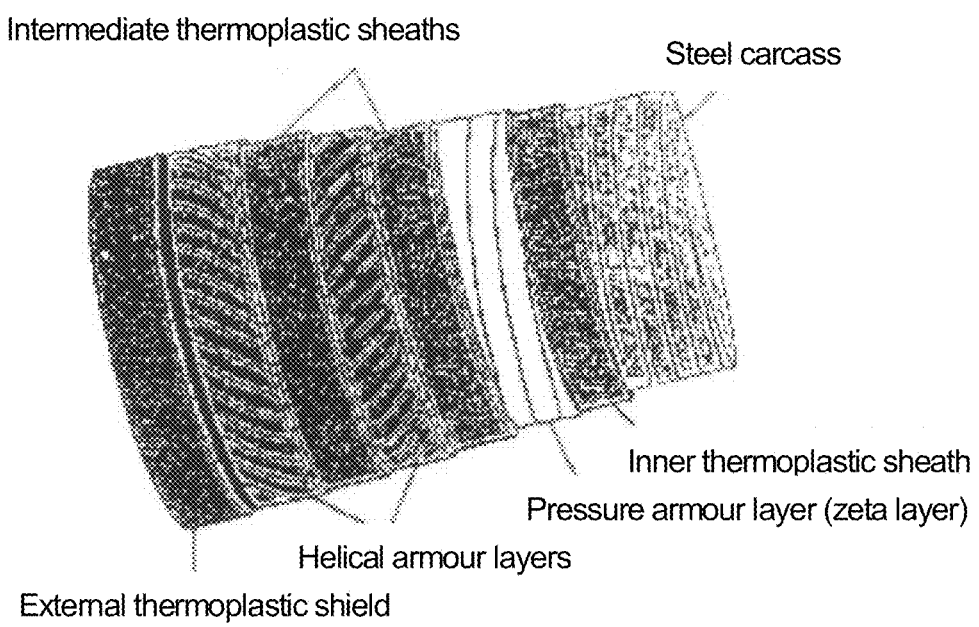
FIG. 2 is a view illustrating a layer structure of a riser used in a conventional oil collecting ship.
Figure 3:
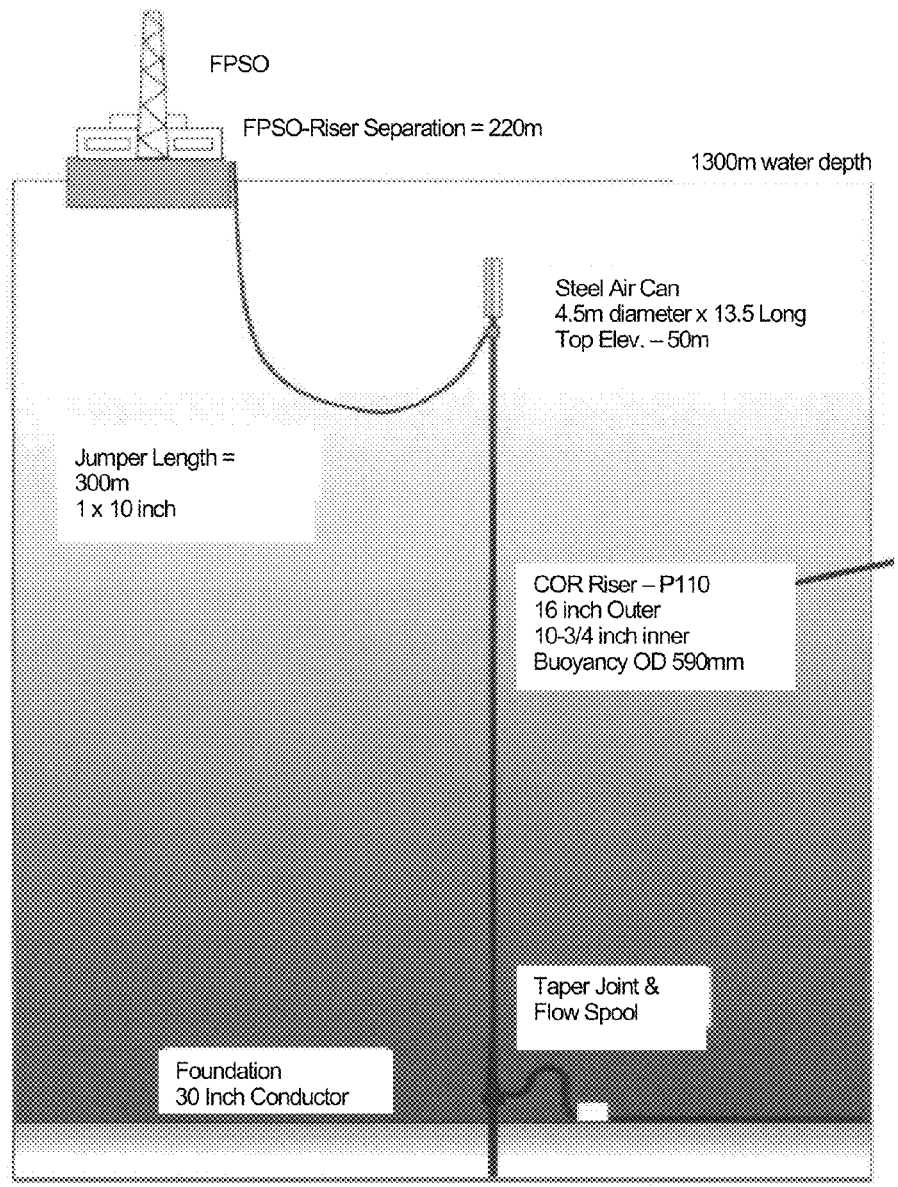
FIG. 3 is a conceptual view illustrating a conventional crude oil collecting system.
Figure 4:
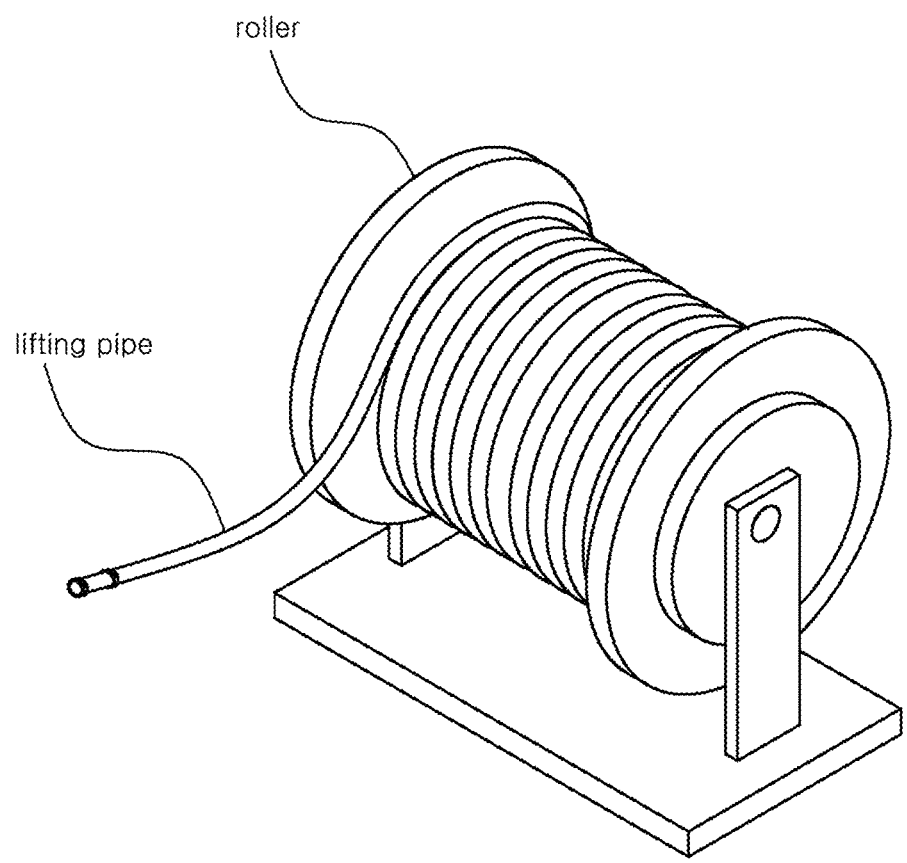
FIG. 4 is a perspective view illustrating a conventional lifting pipe and a roller for rolling the lifting pipe.
Figure 5:
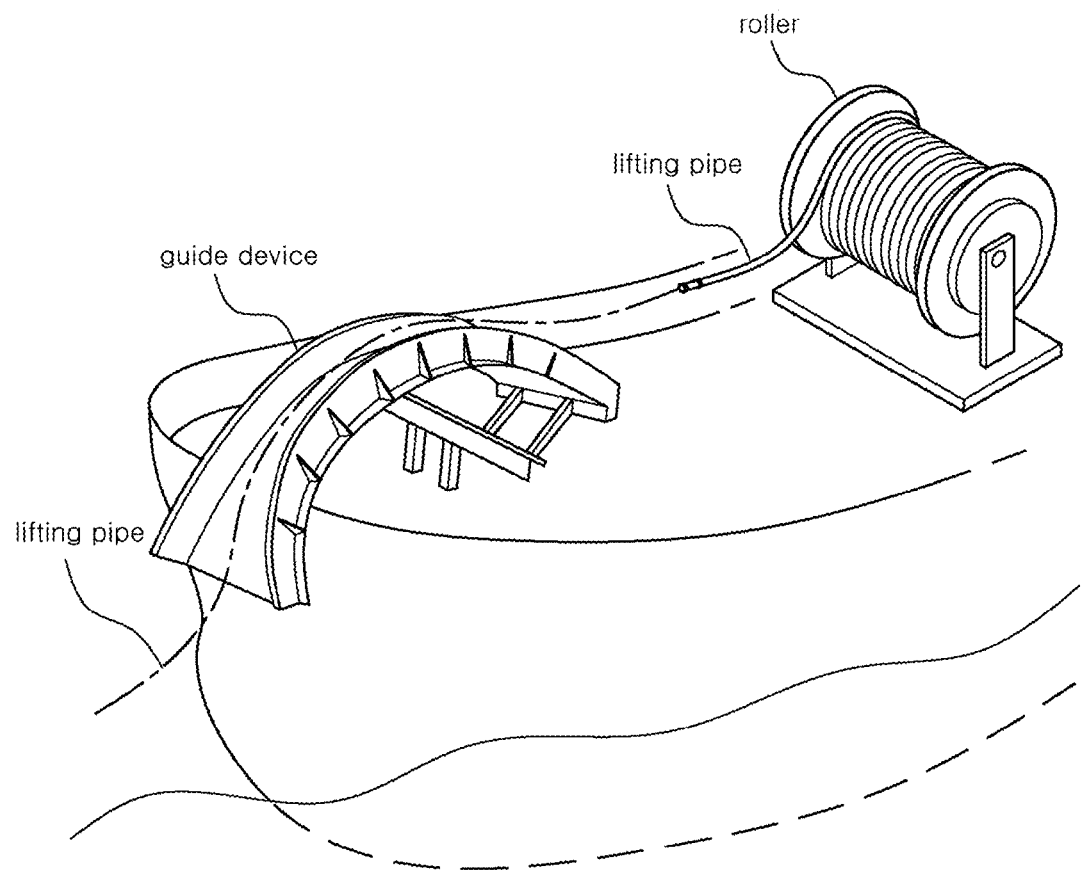
FIG. 5 is perspective view illustrating a guide device used to roll the conventional lifting pipe.
Figure 6:
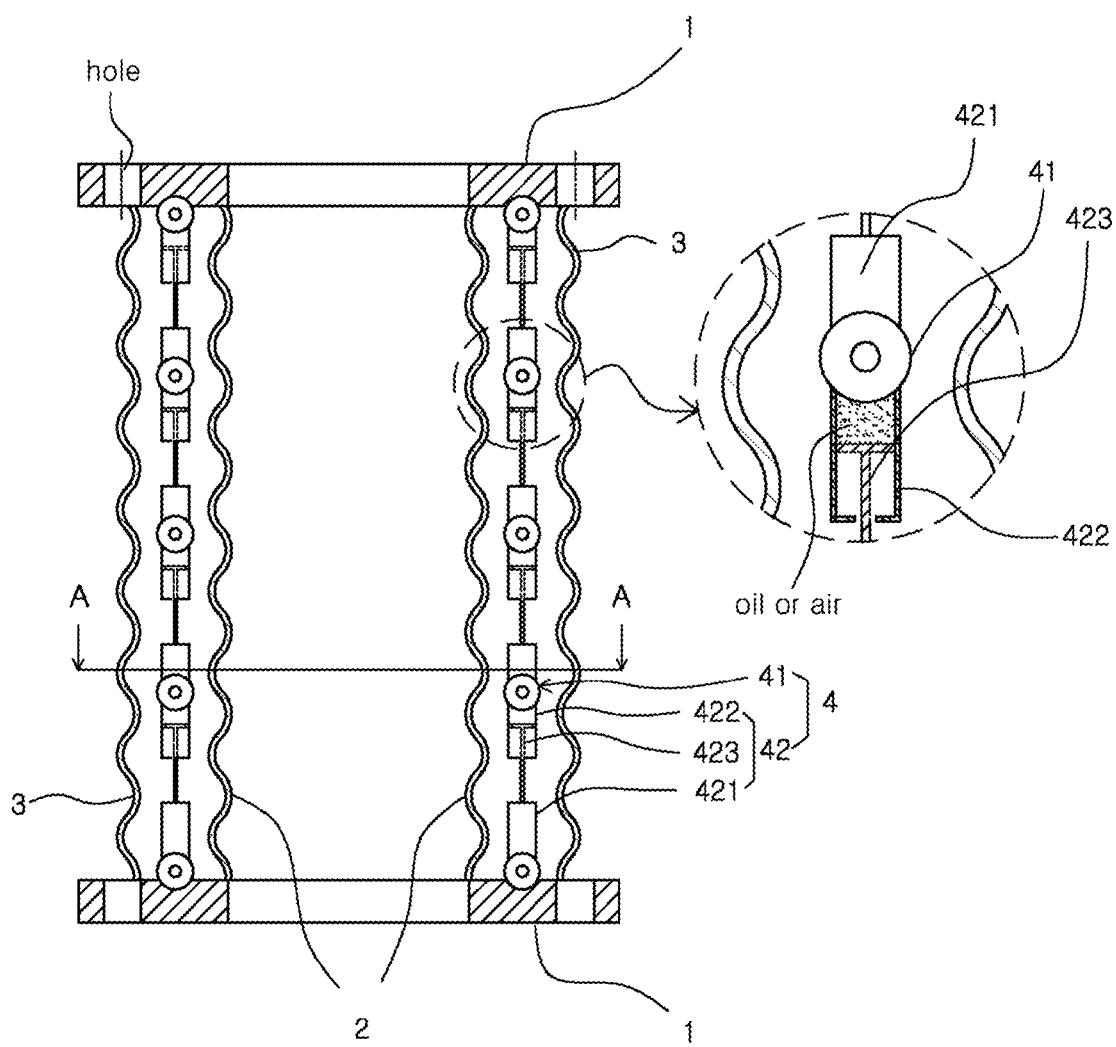
FIG. 6 is a sectional view illustrating a flexible short pipe according to an embodiment of the present invention.
Figure 7:
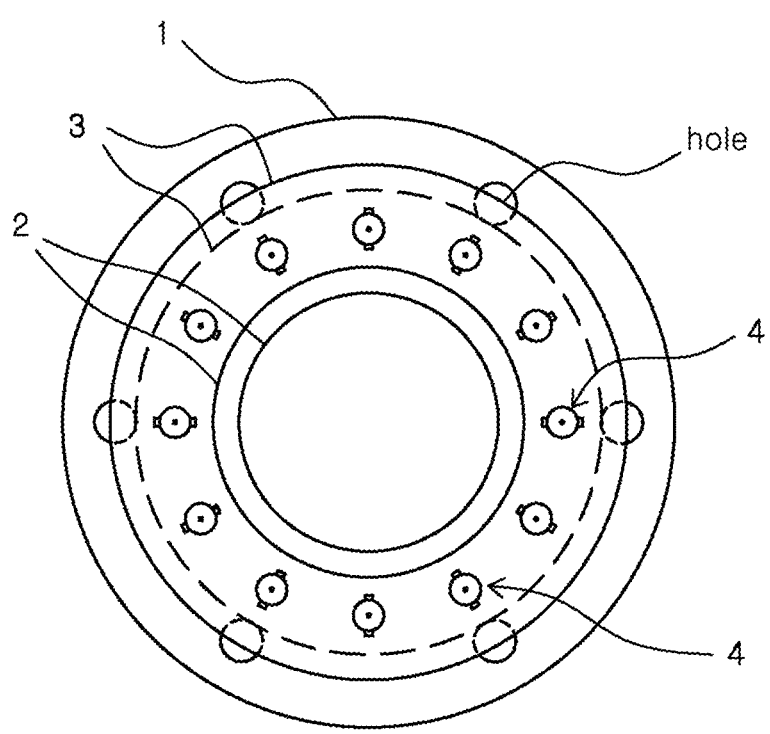
FIG. 7 is a sectional view taken along line A-A of FIG. 6.
Figure 8:
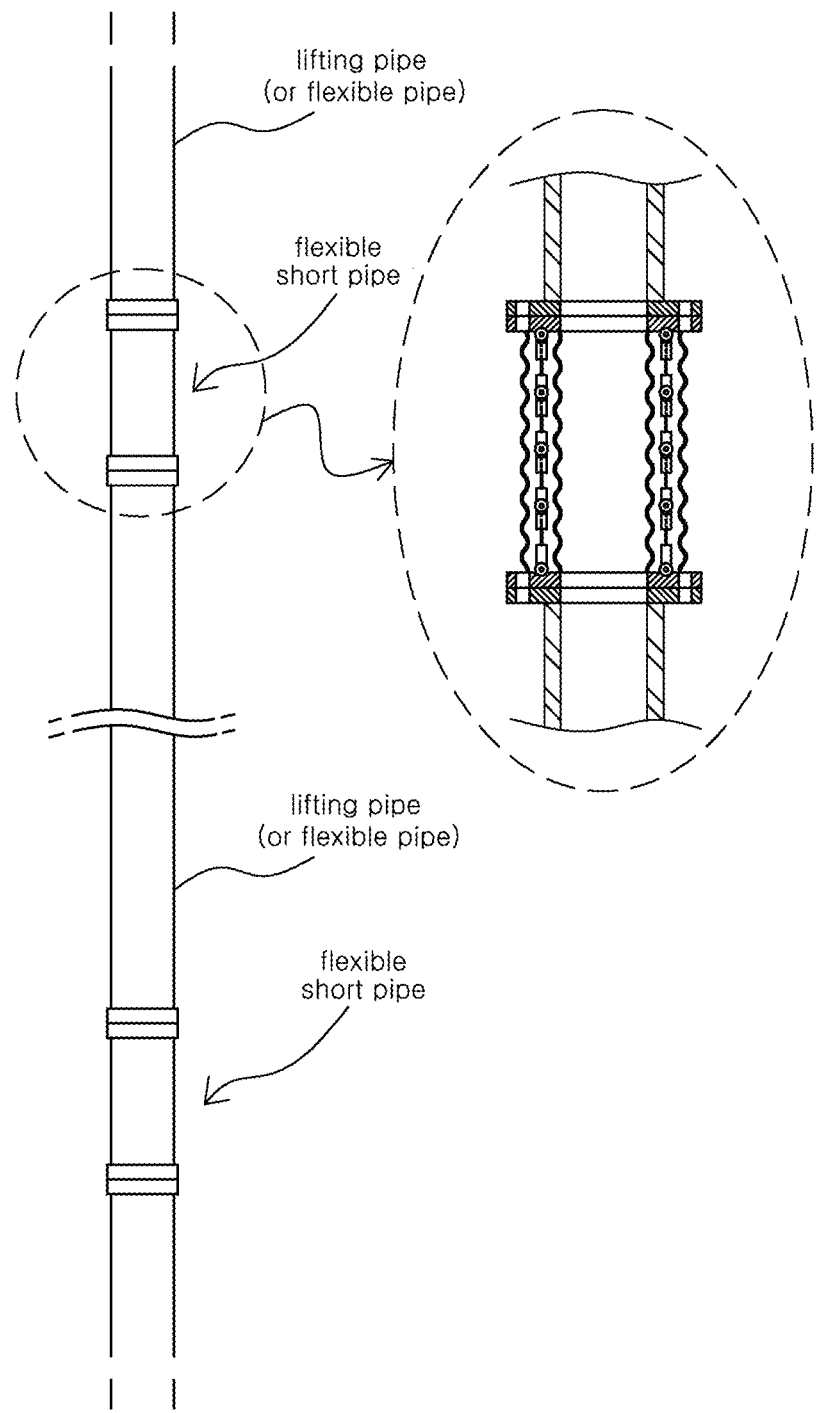
FIG. 8 is a view illustrating a lifting pipe or flexible pipe equipped with flexible short pipes according to the embodiment of the present invention.

FIG. 6 is a sectional view illustrating a flexible short pipe according to an embodiment of the present invention, FIG. 7 is a sectional view taken along line A-A of FIG. 6, FIG. 8 is a view illustrating a lifting pipe or flexible pipe equipped with flexible short pipes according to the embodiment of the present invention, and FIG. 9 is a view illustrating an inner layer structure of the flexible short pipe according to the embodiment of the present invention and a layer structure of a conventional lifting pipe.

As shown in the drawings, the flexible short pipe of the present invention includes upper and lower flanges 1, an inner layer 2, an outer layer 3, and a shock absorbing means 4. The upper and lower flanges 1 are provided on the upper and lower ends of the flexible short pipe to be connected to flanges which are provided on both ends of a unit lifting pipe (or flexible pipe).

The inner layer 2 having a curved shape is provided between the upper and lower flanges 1 to allow slurry, which includes manganese nodules, mud, and seawater and is lifted up or discharged by a lifting pump, to flow therealong.

The outer layer 3 having a curved shape surrounds the inner layer 2.

The shock absorbing means 4 is positioned between the inner layer 2 and the outer layer 3 and functions to absorb shocks, limit extension in a longitudinal direction, and absorb a bending load.

The unit lifting pipe (or flexible pipe) may have a variety of unit lengths. For example, the unit lifting pipe may have a length from several meters to several hundreds of meters or may vary in length as necessary. Similarly, the unit lifting pipe (or flexible pipe) may have a variety of diameters from several centimeters to several tens of centimeters, and is not limited to a specific size.

The shock absorbing means 4 is secured to the upper and lower flanges.

Further, the shock absorbing means 4 is connected to the upper and lower flanges 1 in such a way as to extend in a longitudinal direction. A large number of unit shock absorbing means 4 is independently arranged along a circle and is fastened to the flanges 1. The shock absorbing means 4 may be fastened to the flanges 1 through a general fastening method, for example, using fastening means or by welding.

The flanges 1 are physical devices for coupling lifting pipes or flexible pipes. The flanges 1 may have several coupling constructions, that is, may be constructed to be coupled by inserting a bolt and a nut into a hole or may be constructed to enable simple detachable coupling. The flanges 1 must satisfy the following requirements.

The flanges 1 must endure high pressure. Pressure acting on the lifting pipe is larger than pressure acting on the flexible pipe. Generally, pressure which must be generated by the lifting pump operating at a depth of 5,000 m is about 500 to 700 kgf/cm$^2$. In order to endure the pressure, the flanges 1 must be made of a material which can endure high pressure, and must be constructed to prevent the leakage of pressure.

Further, a gap occurring at a junction between each flange 1 and metal must be filled. This can be realized by using a part such as a gasket.

Therefore, the flanges 1 must endure high pressure and be easily detachably mounted.

The inner layer 2 is a layer which is in contact with slurry, and must be constructed to endure high pressure, similarly to the flanges 1. To this end, as in a conventional riser, the inner layer 2 has a multi-layer structure having a steel carcass, an inner thermoplastic sheath, and a pressure armour layer wherein these are arranged sequentially in a direction from an outer to an inner position.

However, the inner layer 2 must have a shape different from that of the conventional riser. That is, as shown in FIG. 9, the conventional riser has a flat inner layer structure, whereas the inner layer of the present invention has a curved shape.

The curved shape is required for the following reasons. As shown in the section of the shock absorbing means, the present invention may be extended in a longitudinal direction when the shock absorbing means is extended or bent. However, resistance to a longitudinal tensile force is not realized mainly by the inner layer 2. The resistance to the tensile force is realized by joints 41 and shock absorbers 42 constituting the shock absorbing means 4.

That is, when tensile force or bending force is generated by external force, the curved section of the inner layer 2 has only to be extended or bent. To this end, as described above, the inner layer 2 has the multi-layered structure and is made of a material which is resistant to internal pressure.

The outer layer 3 defines the external appearance of the flexible short pipe according to the present invention, and must be manufactured such that its section is curved, similarly to the inner layer 2. The reason is because, when the outer layer 3 is subjected to tensile force in a longitudinal direction, the outer layer 3 must elastically extend to some extent.

The inner layer 2 and the outer layer 3 are spaced apart from each other so that there is a space therebetween. Such a construction aids the operation of the shock absorbing means 4.

The shock absorbing means 4 is constructed to have resistance to a longitudinal tensile force and a bending force. The shock absorbing means 4 includes a plurality of joints 41 which serve as hinges, and shock absorbers 42 which extend or contract in a longitudinal direction. The joints 41 and the shock absorbers 42 are repeatedly arranged in a vertical direction.

Each joint 41 serves as a hinge and is constructed to rotate. Thus, when a bending force is generated by an external force, the joint 41 is bent to correspond to the bending force.

Further, the shock absorbers 42 couple the joints 41 located at upper and lower positions with each other, and are extended in a longitudinal direction when tensile force is generated by an external force. In detail, a stationary part 421 provided on one side is secured to one joint, and a cylindrical movable part 422 provided on the other side is secured to another joint, so that a rod 423 mounted to the stationary part 421 is inserted into the movable part 422 and moves in a vertical direction like a piston, thus coping with changes in length.

When external force, namely, tensile force or bending force is released, each shock absorber 42 is restored to its original state. That is, the front of the rod 423 forming a space with the movable part 422 has a disc shape, so that the rod 423 directly comes into close contact with the inner circumference of the cylindrical movable part 422, or the rod 423 comes into close contact with the inner circumference of the cylindrical movable part 422 via a sealing part such as an O-ring, thus maintaining sealing force and thereby providing the restoring force as described above.

That is, when load is applied in both a longitudinal direction and a bending direction, the sealing space between the rod 423 inserted into the movable part 422 according to the present invention and the movable part 422 is filled with oil or air to be sealed. Thus, in the state in which the shock absorber 42 is not deformed by initial vacuum pressure from a hydraulic or pneumatic mechanism, if the shock absorber 42 is subjected to a longitudinal load and a bending load, the shock absorber 42 is deformed. Meanwhile, if the external force is removed, the shock absorbing means is restored to its original state. As such, the shock absorbing means serves as a kind of spring.

Figure 10A:
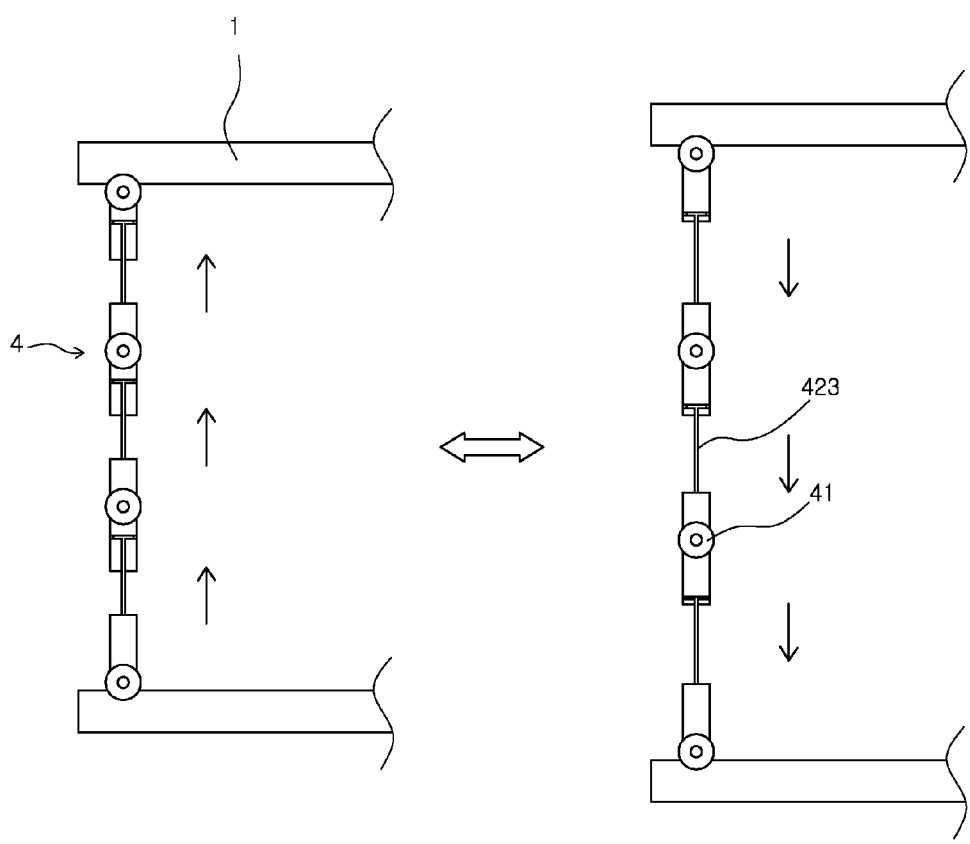
FIG. 10A is a view illustrating the state in which the flexible short pipe according to the embodiment of the present invention is extended in a longitudinal direction thereof.
Figure 10B:
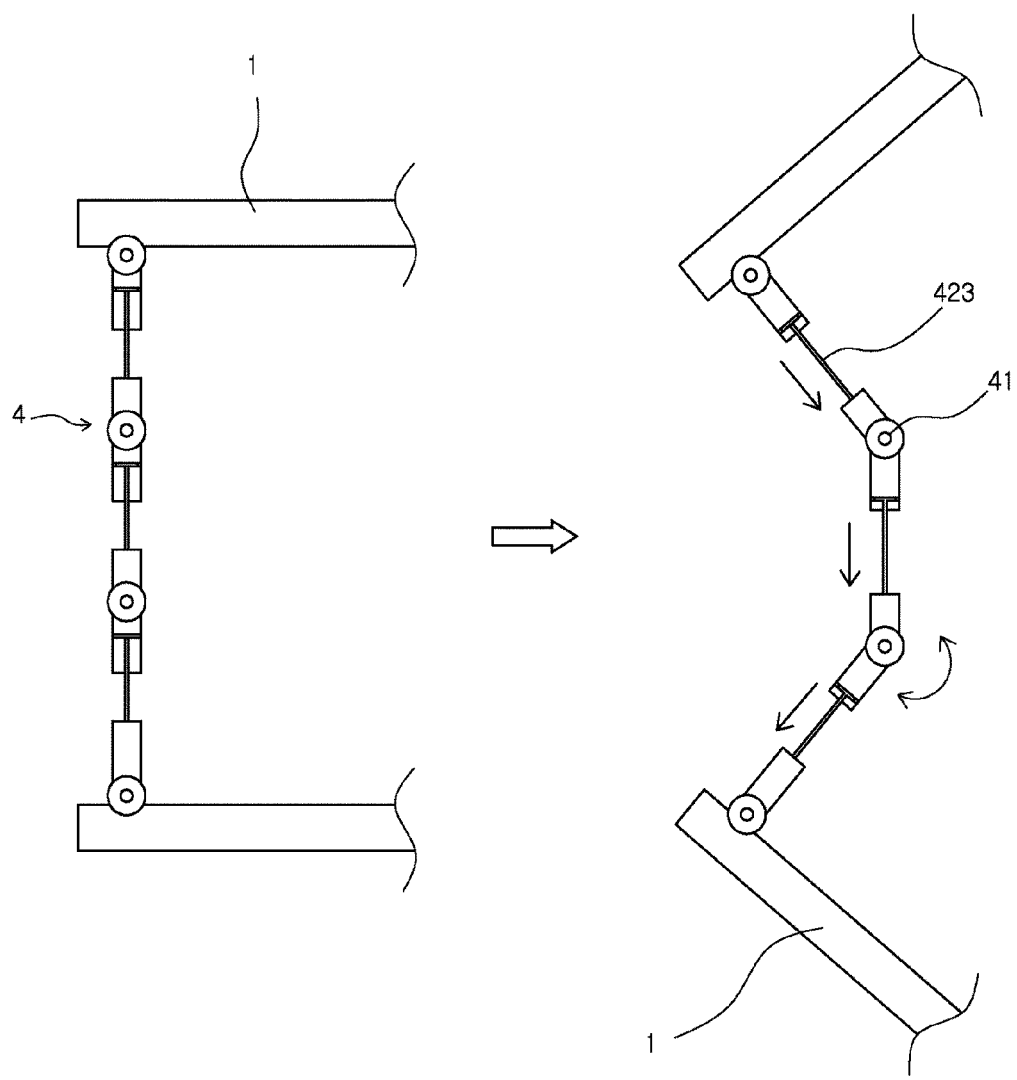
FIG. 10B is a view illustrating the state in which the flexible short pipe according to the embodiment of the present invention is bent.

FIG. 10A is a view illustrating the state in which the flexible short pipe according to the embodiment of the present invention is extended in a longitudinal direction thereof, and FIG. 10B is a view illustrating the state in which the flexible short pipe according to the embodiment of the present invention is bent. The drawings show the states in which the shock absorbing means 4 providing the majority of resistance to tensile force and bending force to the flexible short pipe according to the present invention is extended and bent by resistance to longitudinal tensile force and bending force generated by the joints 41 and the shock absorbers 42 constituting the shock absorbing means 4.

As such, when the shock absorbing means 4 of the flexible short pipe according to the present invention is subjected to tensile force in a longitudinal direction, each shock absorber 42 is extended to a predetermined length so as to absorb shocks. Meanwhile, when the shock absorbing means 4 is not subjected to tensile force, each shock absorber 42 is restored to its original length.

Further, when the shock absorbing means 4 is subjected to bending load, the shock absorbing means 4 is bent by the joints, thus enduring the bending load.

Particularly, when the shock absorbing means 4 is subjected to load in both longitudinal and bending directions, the shock absorbing means 4, which is not deformed by initial vacuum pressure from the hydraulic or pneumatic mechanism of the present invention, is deformed by longitudinal load and bending load as shown in the right of FIG. 10B.

When the external force is removed, the shock absorbing means 4 is restored to its original state. This is the principle of the present invention. That is, when a force is increased in the first hydraulic charging state or vacuum state, a reaction is generated against the increased force, that is, a restoring force is generated by initial vacuum pressure. To this end, the rod 423 must be constructed to have sealing force relative to the space filled with sealing oil or air.

As described above, the present invention is advantageous in that a coupling pipe for coupling lifting pipes (or flexible pipes) has resistance to the tensile force causing longitudinal deformation, and to the bending force generated when wound around a roller and to the torsional load.

In detail, when a ship continuously repeating pitching, rolling and yawing under an external force such as seawater, tide or the wind applies sudden stress to a lifting pipe or flexible pipe, a coupling pipe of the present invention has a resistance to absorbing the stress, thus enabling manganese nodules to be reliably collected.

Further, a coupling pipe of the present invention is not larger than the diameters of lifting pipes (or flexible pipes), thus allowing neighboring lifting pipes (or flexible pipes) to be easily coupled to each other when the lifting pipes are wound to be stored or unwound to be put into the sea using a roller or a guide device.

Further, the present invention is advantageous in that a flexible short pipe coupled to a lifting pipe (or flexible pipe) is resistant to a bending load and a torsional load acting on the lifting pipe (or flexible pipe). The resistance to the bending load and torsional load is important when the flexible short pipe coupled to the lifting pipe (or flexible pipe) is wound around a roller, in comparison with when the flexible short pipe enters the seawater. When the lifting pipe (or flexible pipe) and the flexible short pipe are wound around a roller having a predetermined diameter, the lifting pipe (or flexible pipe) and the flexible short pipe are subjected to a bending load. Further, a long lifting pipe (or flexible pipe) and a flexible short pipe are subjected to torsional load. The present invention has resistance to the stress.

As described above, the present invention has various advantages and is useful, so that the industrial availability thereof is remarkably expected.

Although the preferred embodiment of the present invention has been disclosed for illustrative purposes, those skilled in the art will appreciate that various modifications, additions and substitutions are possible, without departing from the scope and spirit of the invention as disclosed in the accompanying claims.

What is claimed is:

1. A flexible short pipe having a shock absorbing function, comprising:
    flanges provided at upper and lower ends of the flexible short pipe to be coupled to a unit lifting pipe or a flexible pipe;
    an inner layer having a curved shape and provided between the upper and lower flanges to allow slurry, lifted up or discharged by a lifting pump, to flow along the inner layer;
    an outer layer having a curved shape and surrounding the inner layer; and
    at least one shock absorbing unit positioned between the inner layer and the outer layer, and absorbing longitudinal force and bending force, the shock absorbing unit including
    a plurality of joints serving as hinges, and
    a plurality of shock absorbers extending or contracting in a longitudinal direction, the joints and the shock absorbers being repeatedly arranged in a vertical direction and secured to the upper and lower flanges.

2. The flexible short pipe as set forth in claim 1, wherein the at least one shock absorbing unit secured to the upper and lower flanges are arranged along a circle.

3. The flexible short pipe as set forth in claim 1, wherein the inner layer of the curved shape has a multi-layer structure including a steel carcass, an inner thermoplastic sheath and a pressure armour layer which are sequentially arranged in a direction from an outer to an inner position.

4. The flexible short pipe as set forth in claim 1, wherein each of the shock absorbers includes
    a stationary part provided on a first side of the shock absorber and secured to a first joint,
    a cylindrical movable part provided on a second side of the shock absorber and secured to a second joint, and
    a rod provided on the stationary part and inserted into the cylindrical movable part in such a way as to move in a vertical direction.

5. The flexible short pipe as set forth in claim 4, wherein a sealing space defined between the movable part and the rod is filled with oil or air, so that a restoring force is generated when stress is removed.

6. The flexible short pipe as set forth in claim 1, wherein the inner layer and the outer layer are spaced apart from each other to have a space therebetween.

* * * * *